(12) United States Patent
Takasaki et al.

(10) Patent No.: US 9,698,556 B2
(45) Date of Patent: Jul. 4, 2017

(54) LASER AMPLIFICATION DEVICE

(71) Applicant: MITSUBISHI ELECTRIC CORPORATION, Tokyo (JP)

(72) Inventors: Takuya Takasaki, Tokyo (JP); Yojiro Watanabe, Tokyo (JP); Takeshi Sakimura, Tokyo (JP); Takayuki Yanagisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/915,741

(22) PCT Filed: May 14, 2014

(86) PCT No.: PCT/JP2014/002542
§ 371 (c)(1),
(2) Date: Mar. 1, 2016

(87) PCT Pub. No.: WO2015/029285
PCT Pub. Date: Mar. 5, 2015

(65) Prior Publication Data
US 2016/0197450 A1    Jul. 7, 2016

(30) Foreign Application Priority Data
Sep. 2, 2013  (JP) ................ 2013-180874

(51) Int. Cl.
*H01S 3/063*  (2006.01)
*H01S 3/08*   (2006.01)
(Continued)

(52) U.S. Cl.
CPC ........ *H01S 3/0632* (2013.01); *H01S 3/08095* (2013.01); *H01S 3/0941* (2013.01);
(Continued)

(58) Field of Classification Search
CPC ...... H01S 3/0632; H01S 3/23; H01S 3/08095; H01S 3/2308; H01S 3/2383
See application file for complete search history.

(56) References Cited

U.S. PATENT DOCUMENTS 5,268,787 A    12/1993  McIntyre
6,061,377 A     5/2000  Brassart et al.
(Continued)

FOREIGN PATENT DOCUMENTS

JP    62-200781    *  9/1987
JP    S62-200781 A    9/1987
(Continued)

OTHER PUBLICATIONS

International Search Report—PCT/JP2014/002542 mailed Aug. 19, 2014.
(Continued)

*Primary Examiner* — Dung Nguyen
(74) *Attorney, Agent, or Firm* — Studebaker & Brackett PC (57) ABSTRACT

Plural signal beams enter a planar waveguide laser amplifier from different directions to follow different paths therein, which reduces a region not contributing to amplification where no signal beam passes. Plural signal beams follow different paths in the planar waveguide, and a second signal beam utilizes the gain of a portion of the planar waveguide that a first signal beam cannot utilize. By this configuration, a region not contributing to amplification of the signal beams in the planar waveguide laser amplifier can be reduced, causing to efficiently amplify plural signal beams.

9 Claims, 8 Drawing Sheets

(51) Int. Cl.
*H01S 3/0941* (2006.01)
*H01S 3/23* (2006.01)
*H01S 3/06* (2006.01)

(52) U.S. Cl.
CPC ............ *H01S 3/09415* (2013.01); *H01S 3/23* (2013.01); *H01S 3/2308* (2013.01); *H01S 3/2383* (2013.01); *H01S 3/0621* (2013.01); *H01S 3/0623* (2013.01)

(56) References Cited

U.S. PATENT DOCUMENTS

| | | |
|---|---|---|
| 2003/0063884 A1 | 4/2003 | Smith et al. |
| 2006/0114961 A1 | 6/2006 | Manni |
| 2009/0245304 A1 | 10/2009 | Peng et al. |
| 2010/0086001 A1 | 4/2010 | Manni |
| 2010/0272137 A1 | 10/2010 | Kopf et al. |
| 2011/0243166 A1 | 10/2011 | Manni |
| 2012/0194888 A1* | 8/2012 | Klug ........................ G03H 1/20 359/23 |
| 2013/0163624 A1 | 6/2013 | Miyanaga et al. |

FOREIGN PATENT DOCUMENTS

| | | |
|---|---|---|
| JP | H02-260678 A | 10/1990 |
| JP | 2003-023194 A | 1/2003 |
| JP | 2005-251981 A | 9/2005 |
| JP | 2007-227448 A | 9/2007 |
| JP | 2008-521257 A | 6/2008 |
| JP | 2008-522409 A | 6/2008 |
| JP | 2009-277943 A | 11/2009 |
| JP | 4486664 B2 | 4/2010 |
| JP | 2011-517066 A | 5/2011 |
| JP | 2011-129826 A | 6/2011 |
| JP | 2012-78813 * | 4/2012 |
| JP | 2012-078813 A | 4/2012 |

OTHER PUBLICATIONS

The extended European search report issued by the European Patent Office on Apr. 3, 2017, which corresponds to uropean Patent Application No. 14840437.9-1556 and is related to U.S. Appl. No. 14/915,741.

* cited by examiner

LASER AMPLIFICATION DEVICE

TECHNICAL FIELD

The present invention relates to a laser amplification device that amplifies a laser beam.

BACKGROUND ART

A planar waveguide laser amplifier is configured with a waveguide element including a laser medium and clad layers which have a refractive index smaller than that of the laser medium and are put on the top and bottom faces thereof. In the waveguide element, a laser beam is totally reflected between a core layer and clad layer to propagate in a waveguide mode. In a planar waveguide element, population inversion is produced by excitation light, and the laser beam is amplified by passing through the planar waveguide element.

When a laser beam is inputted to the planar waveguide laser amplifier, the laser beam is inputted through an anti-reflection film formed in a part of the planar waveguide element. The amplification gain of the laser beam is improved by making the laser beam reflect multiple times on total reflection films formed on the planar waveguide element's side faces opposing with each other to make the beam path length longer. The amplified laser beam is outputted through an anti-reflection film formed on a part of the planar waveguide element. In Patent Document below, the configuration of this planar waveguide laser amplifier is described.

PRIOR ART DOCUMENT

Patent Document

Patent Document 1:US2003/0063884 A1

SUMMARY OF THE INVENTION

Problem to be Solved by the Invention

In a conventional planar waveguide laser amplifier, a signal beam inputted to a planar waveguide element is amplified at a portion in a planar waveguide through which excitation light passes. The excitation light also produces population inversion in a region in the planar waveguide where the signal beam does not pass; however, the region does not contribute to amplifying the signal beam. Therefore, it is required to reduce a region which does not contribute to the signal beam's amplification even with the excitation light inputted to increase the output of a laser beam under certain excitation light. That is, improvement of an efficiency to extract an output of the amplified beam with respect to excitation light inputted has been an issue.

Embodiments of the present invention are made in consideration of the above and are aimed at improving an efficiency to extract an output of the amplified beam with excitation light inputted.

Means for Solving Problem

To accomplish the aim described above, a laser amplification device according to the present invention is characterized in that the laser amplification device includes a planar waveguide laser amplifier to amplify and output an inputted beam, and an input unit to simultaneously input plural beams into the planar waveguide laser amplifier.

Effect of the Invention

In a laser amplification device according to the present invention, it is possible to improve an efficiency to extract an output of the amplified beam with excitation light inputted.

MODES FOR CARRYING OUT THE INVENTION

Embodiment 1

Figure 1:
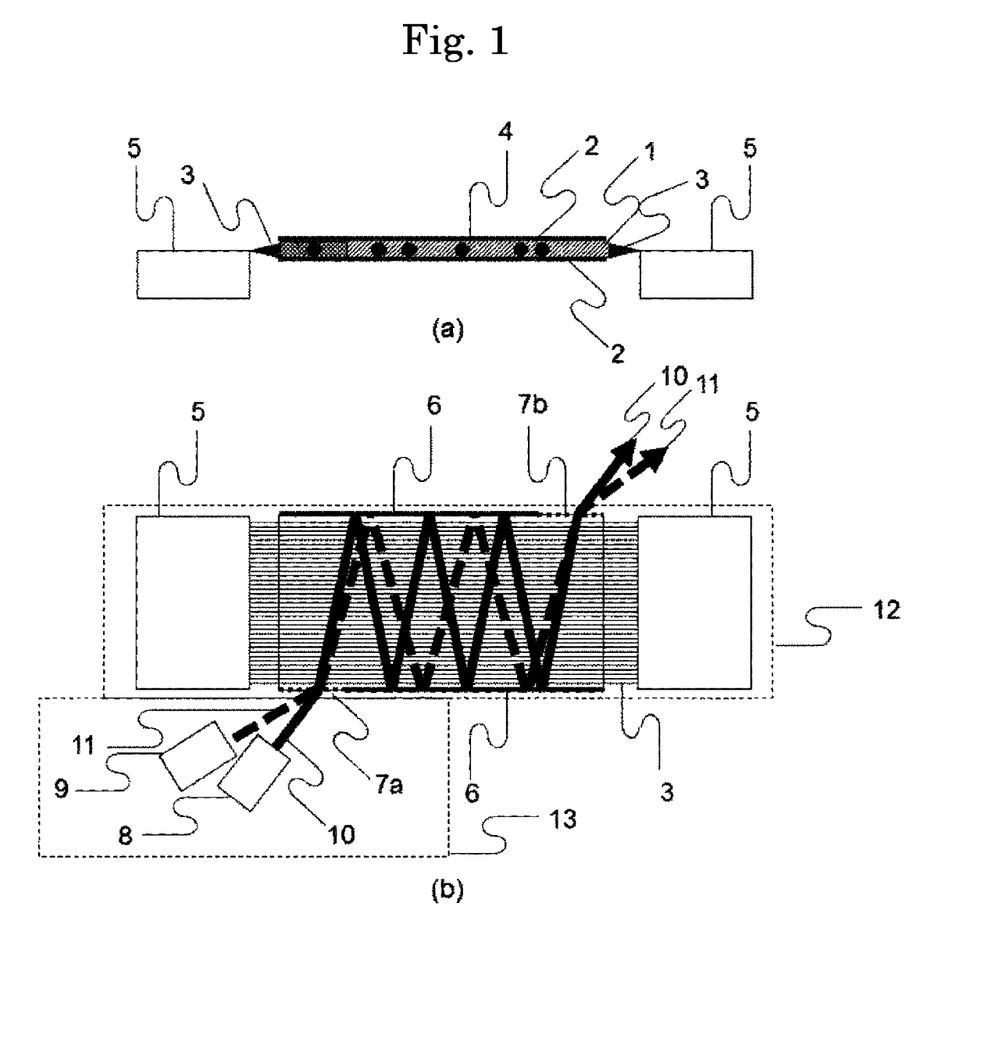
FIGS. 1 are views showing the configuration of a planar waveguide laser amplification device according to Embodiment 1 of the present invention.

FIGS. 1 show the configuration of a planar waveguide laser amplification device according to Embodiment 1 of the present invention. FIG. 1(*a*) is a side view of the planar waveguide laser amplification device, and FIG. 1(*b*) is a top front view thereof. In FIGS. 1, numeral "1" denotes a core layer; "2", clad layers; "3", excitation light; "4", a planar waveguide; "5", semiconductor lasers for excitation; "6", total reflection films;"7*a*" and "7*b*", anti-reflection films; "8", a first signal beam laser; "9", a second signal beam laser; "10", a first signal beam; "11", a second signal beam; "12", a laser amplifier; and "13", an input unit. In addition, in the figures, the same symbols denote an identical part or a corresponding part.

In FIG. 1(*a*), the material of the core layer 1 in the planar waveguide 4 is solid, and a typical laser medium can be used therefor. As a laser medium, a material to absorb the excitation light 3 outputted from the semiconductor lasers 5 for excitation is used. The semiconductor lasers 5 for excitation are excitation light sources to output the excitation light 3 which enters the planar waveguide 4. A medium used for the core layer 1 is, for example, Nd:YAG, Yb:YAG, Er:YAG, Tm:YAG, Ho:YAG, Nd:YLF, Yb:YLF, Er:YLF, Tm:YLF, Ho:YLF, Nd:Glass, Cr:LiSAF, or Ti:Sapphire.

In the planar waveguide 4, the clad layers 2 are formed on the top and bottom faces of the core layer 1, and the clad layers 2 play a role to confine the excitation light 3 in the core layer 1. The clad material of the clad layers 2 is a medium having a refractive index $n_2$ lower than the refractive index $n_1$ of the core layer 1 ($n_1 > n_2$). A medium such as $SiO_2$, $Al_2O_3$, or $MgF_2$ can be used for the clad layers 2.

In FIG. 1(b), the laser amplification device includes a laser amplifier 12 and an input unit 13. The input unit 13 includes the first signal beam laser 8 and the second signal beam laser 9, which output a first signal beam 10 and second signal beam 11 with a same wavelength, respectively. In addition, a semiconductor laser or a fiber laser can be used as the first signal beam laser 8 and the second signal beam laser 9. As described above, the input unit 13 simultaneously inputs plural beams into the laser amplifier 12, and the plural inputted beams are amplified in the planar waveguide 4.

The laser amplifier 12 includes the planar waveguide 4 and the semiconductor lasers 5 for excitation and is provided with the total reflection films 6 and the anti-reflection films 7a and 7b on two side faces of the planar waveguide 4. The total reflection films 6 are materials to reflect the first signal beam 10 and the second signal beam 11, and are formed on the two side faces of the planar waveguide 4 where the excitation light 3 enters. The anti-reflection films 7a and 7b are materials to pass the first signal beam 10 and the second signal beam 11, and are provided on portions of the side faces where the total reflection films 6 are formed.

Next, operations will be explained. In the laser amplifier 12, the excitation light 3 outputted from the semiconductor lasers 5 for excitation enters from side faces of the planar waveguide 4. The excitation light 3 having entered in the planar waveguide 4 is totally reflected on interfaces between the core layer 1 and the clad layers 2 provided on the top and bottom faces thereof. The excitation light 3 totally reflected on the interfaces between the core layer 1 and the clad layers 2 is confined within and guided along the core layer 1. The excitation light 3 confined within and guided along the core layer 1 is absorbed by the core layer 1 so that a population inversion is produced in the core layer to have a laser gain.

The input unit 13 outputs the first signal beam 10 from the first signal beam laser 8 to be inputted into the planar waveguide 4 through the anti-reflection film 7a. The first signal beam 10 is totally reflected on the interfaces between the core layer 1 and the clad layers 2 in the planar waveguide 4. The first signal beam 10 totally reflected on the interfaces between the core layer 1 and the clad layers 2 is confined within and guided along the core layer 1. The first signal beam 10 repeats reflection between the total reflection films 6 formed on the side faces of the planar waveguide 4 to follow a zigzag course, thereby getting amplified by a laser gain induced in the planar waveguide 4 by the semiconductor lasers 5 for excitation. The first signal beam 10 passes through the anti-reflection film 7b formed on the side face of the planar waveguide 4 to be outputted outside the planar waveguide 4.

The second signal beam 11 outputted from the second signal beam laser 9 is also inputted into the planar waveguide 4 from the anti-reflection film 7a. Similarly to the first signal beam 10, the second signal beam 11 is confined within and guided along the core layer 1, and passes through the anti-reflection film 7b to be outputted outside the planar waveguide 4.

In Embodiment 1, each of the first signal beam 10 and the second signal beam 11 which are plural beams produced by the input unit 13 enters the planar waveguide 4 in the laser amplifier 12 from a same side face of the planar waveguide 4, but enters at an input angle different from each other. Therefore, in the planar waveguide 4, the second signal beam 11 goes along a path different from that of the first signal beam 10, to utilize a gain of a portion of the planar waveguide 4 that the first signal beam 10 cannot utilize.

As described above, in Embodiment 1 of the present invention, there are provided the laser amplifier 12 that amplifies and outputs received beams, and the input unit that inputs, at the same time, plural beams into the laser amplifier 12. When such a configuration is used, plural beams of the first signal beam 10 and the second signal beam 11 enter the core layer 1 with a population inversion produced by the excitation light 3, and each go along different paths, thereby making it possible to increase the laser beam amplification factors. As a result, with respect to excitation light 3 having a certain level of intensity, an extraction efficiency higher than those of conventional planar waveguide laser amplifiers can be obtained, thereby improving the extraction efficiency of the outputted amplification beam with respect to the inputted excitation light. When setting so that the outputs of the signal beams are made equal, an output per signal beam can be made lower than that extracted by a conventional technique in which a single signal beam is used, thereby suppressing non-linear effects such as Brillouin scattering and Raman scattering.

Embodiment 2

Figure 2:
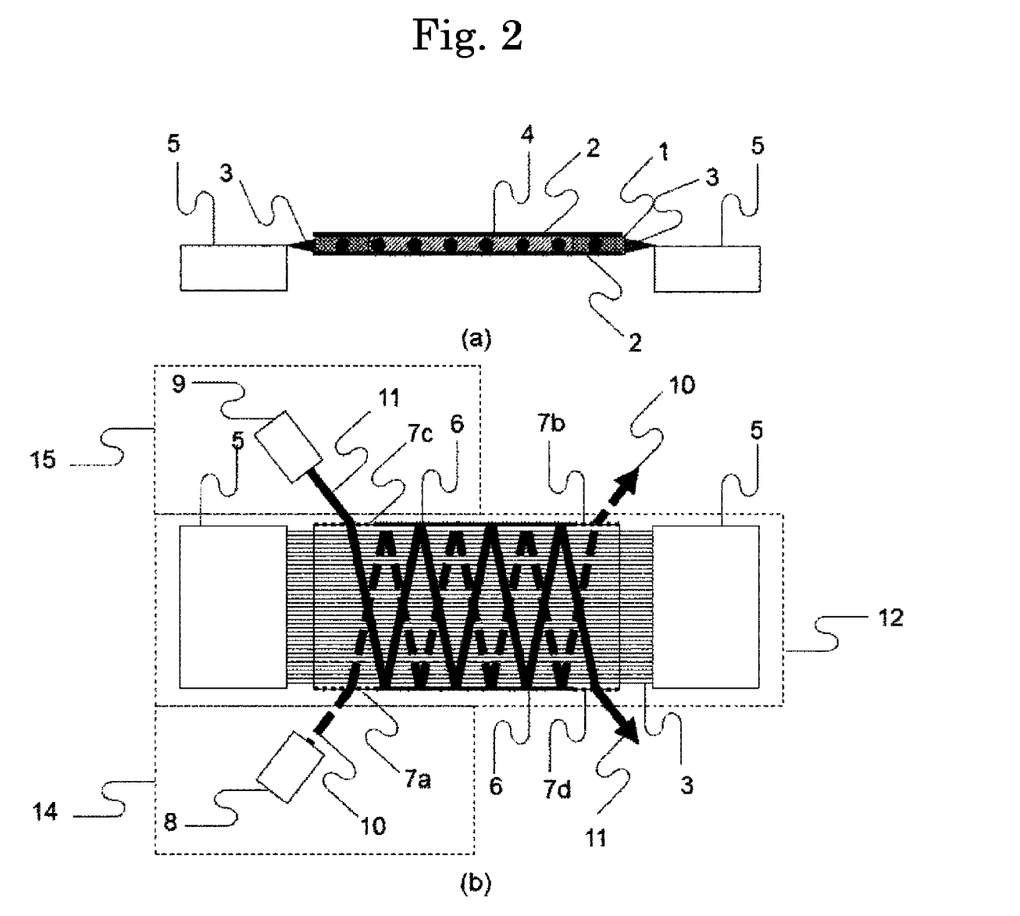
FIGS. 2 are views showing the configuration of a planar waveguide laser amplification device according to Embodiment 2 of the present invention.

In Embodiment 1, the input unit 13 inputs the first signal beam 10 and the second signal beam 11 through a same side face of the laser amplifier 12; however, in Embodiment 2, a configuration will be shown in which a laser amplifier 12 inputs the first signal beam 10 and the second signal beam 11 through different side faces of the laser amplifier 12.

FIGS. 2 show the configuration of a planar waveguide laser amplification device according to Embodiment 2 of the present invention. FIG. 2(a) is a side view of the planar waveguide laser amplifier; FIG. 2(b) is a top front view thereof. In FIGS. 2, "7c" and "7d" denote anti-reflection films; "14" and "15" denote input units.

In Embodiment 2, the first signal beam 10 from the input unit 14 is inputted through an anti-reflection film 7a on a side face of the laser amplifier 12 into a planar waveguide 4 in the laser amplifier 12. On the other hand, the second signal beam 11 from the input unit 15 is inputted through an anti-reflection film 7c on another side face of the laser amplifier 12 into the planar waveguide 4 of the laser amplifier 12. In the planar waveguide 4, the first signal beam 10 inputted through the anti-reflection film 7a is totally reflected on interfaces between a core layer 1 and clad layers 2. The first signal beam 10 totally reflected on the interfaces between the core layer 1 and the clad layers 2 is confined within and guided along the core layer 1. In a direction vertical to the waveguide direction, the first signal beam 10 repeats reflection between the total reflection films 6 formed on side faces of the planar waveguide 4 to follow a zigzag course, thereby getting amplified by a laser gain induced in the planar waveguide 4 by semiconductor lasers 5 for excitation. The first signal beam 10 passes through an anti-reflection film 7b formed on a side face of the planar waveguide 4 to be outputted outside the planar waveguide 4.

Similarly, the second signal beam 11 inputted through an anti-reflection film 7c provided on a side face of the laser amplifier 12 opposing to the anti-reflection film 7a, is confined within and guided along the core layer 1 in the planar waveguide 4. The second signal beam 11 repeats reflection between the total reflection films 6 formed on the side faces of the planar waveguide 4 to follow a zigzag course, thereby getting amplified by the laser gain induced in the planar waveguide 4 by the semiconductor lasers 5 for excitation. Here, in the planar waveguide 4, the second signal beam 11 goes along a path different from that the first signal beam 10 goes along. The second signal beam 11 passes through an anti-reflection film 7d formed on a side face of the planar waveguide 4 to be outputted outside the planar waveguide 4. As described above, the input units 14 and 15 have a feature in that the input units input plural beams into different side faces of the laser amplifier 12.

In the planar waveguide 4, the second signal beam 11 goes along a path different from that of the first signal beam 10, to utilize a gain of a portion of the planar waveguide 4 that the first signal beam 10 cannot utilize. This leads to a result that, when using the configuration shown in Embodiment 2 of the present invention, it is possible to obtain an extraction efficiency higher than those of conventional planar waveguide laser amplifiers. In Embodiment 1, input positions and output positions for the first signal beam 10 and the second signal beam 11 are the same; however, in Embodiment 2, input positions and output positions for the first signal beam 10 and the second signal beam 11 are different.

More specifically, the input units 14 and 15 input the first signal beam 10 and the second signal beam 11 into the laser amplifier 12 through different side faces of the laser amplifier 12, respectively. This causes a laser power density on the anti-reflection film 7a to be lowered than that in Embodiment 1, thereby lowering the possibility that the laser outputs deteriorate the anti-reflection film 7b.

Embodiment 3

Figure 3:
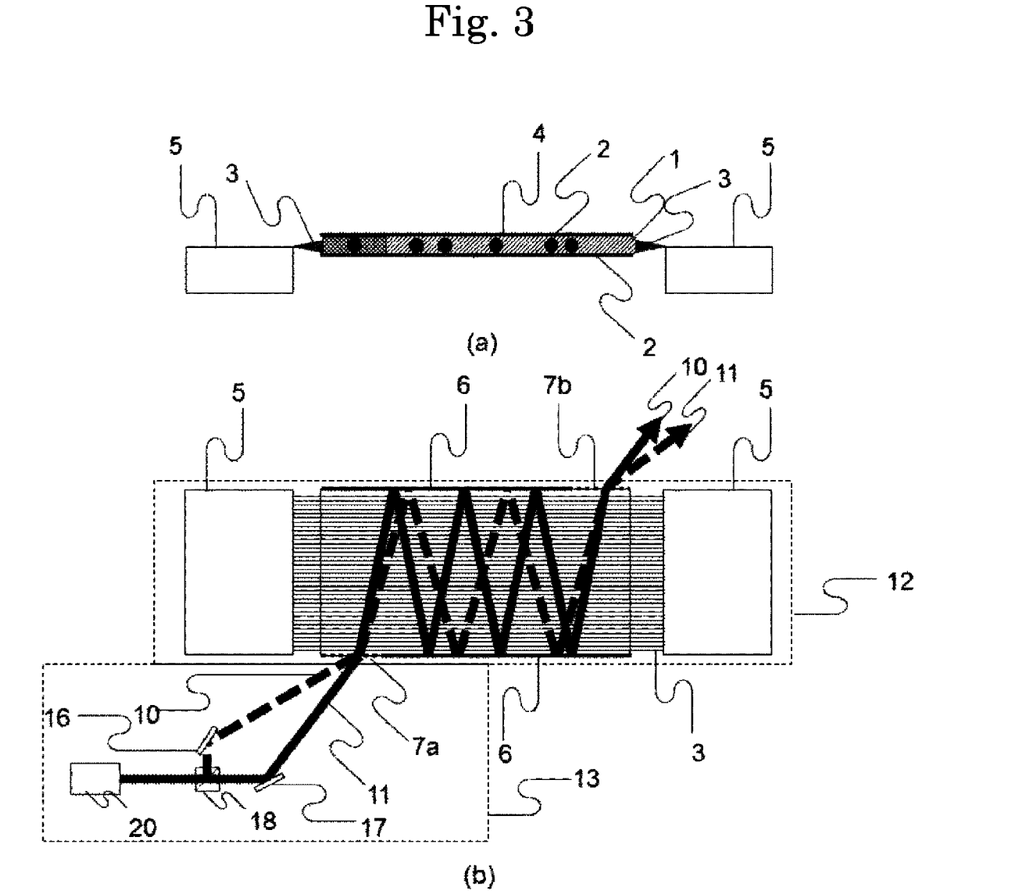
FIGS. 3 are views showing the configuration of a planar waveguide laser amplification device according to Embodiment 3 of the present invention.

In Embodiments 1 and 2, the first signal beam 10 and the second signal beam 11 are outputted from individual signal beam lasers; however, in Embodiment 3, a configuration will be shown in which the first signal beam 10 and the second signal beam 11 is outputted from a same signal beam laser.

FIG. 3 show a configuration of a planar waveguide laser amplification device according to Embodiment 3 of the present invention. FIG. 3(*a*) is a side view of the planar waveguide laser amplifier; FIG. 3(*b*) is a top front view thereof. In FIG. 3, "16" and "17" denote total reflection mirrors; "18" denotes a beam splitter; "20" denotes a signal beam laser.

Embodiment 3 has a feature in that signal beams, which are outputted from individual signal beam lasers in Embodiment 1 and Embodiment 2, are outputted from a single signal beam laser 20. A signal beam outputted from the signal beam laser 20 in an input unit 13 is divided, by a beam splitter 18, into a first signal beam 10 and a second signal beam 11. The angle of the first signal beam 10 is adjusted by a total reflection mirror 16, and then the first signal beam is inputted into a planar waveguide 4 through an anti-reflection film 7a. Similarly, the angle of the second signal beam 11 is also adjusted by a total reflection mirror 17, and then the second signal beam is inputted into the planar waveguide 4 through an anti-reflection film 7a. As described above, plural beams are produced by dividing a beam outputted from the single signal beam laser 20 with a splitter such as the beam splitter 18, and the plural beams are inputted from different positions into the planar waveguide 4 in the laser amplifier 12.

Figure 4:
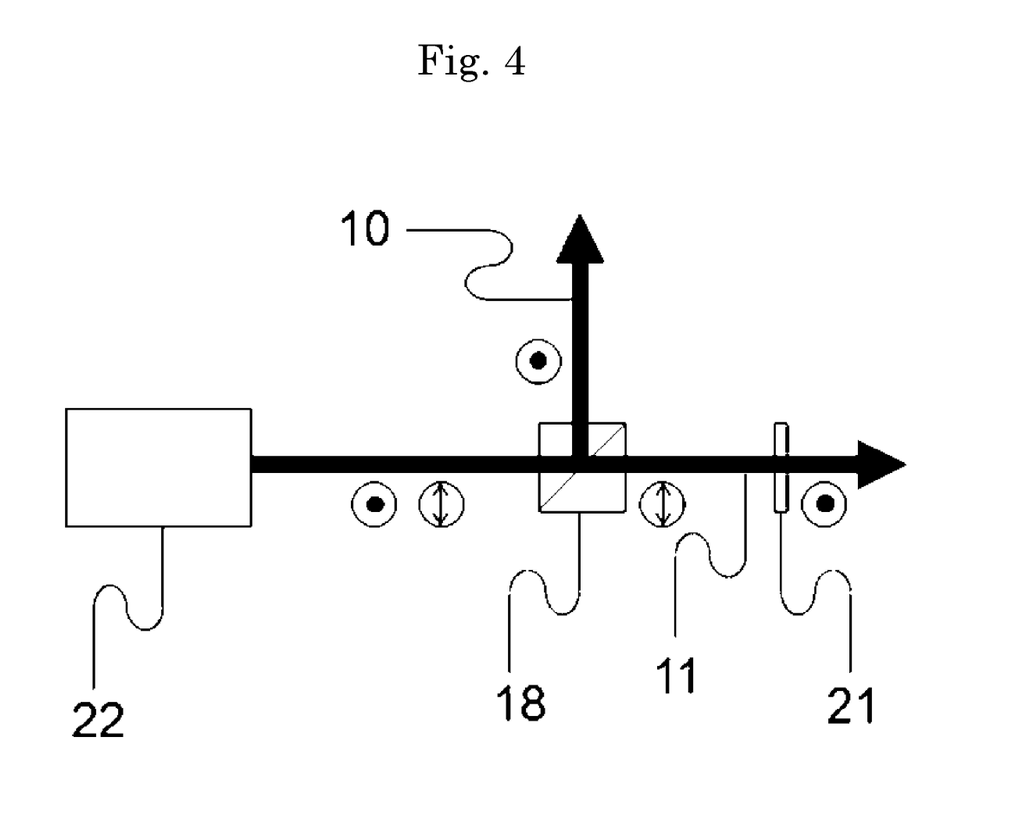
FIG. 4 is an illustration explaining a method for dividing a signal beam from a signal beam laser.

FIG. 4 is an illustration that explains a method for dividing the signal beam outputted from the single signal beam laser 20 into the first signal beam 10 and the second signal beam 11. A non-polarization laser 22 is used as the signal beam laser 20. In the figure, "21" donates a half-wave plate; "22" donates a non-polarization laser. In the non-polarization laser 22, a polarized beam vertical to the sheet of FIG. 4 and a polarized beam parallel thereto are mixed. When a laser that is outputted from the non-polarization laser 22 and includes the polarized beams enters a polarization beam splitter 18, the polarization beam component vertical to the sheet is reflected by the polarization beam splitter 18 to become a first signal beam 10. On the other hand, the polarization beam component parallel to the sheet passes through the polarization beam splitter 18 to become a second signal beam 11. As described above, the polarization beam splitter 18 can separate the laser into plural beams. Furthermore, if a half-wave plate 21 is inserted in the first signal beam 10 or the second signal beam 11, the polarization directions of the first signal 10 and the second signal 11 can be adjusted to the same direction. According to a method having been explained in FIG. 4, the first signal beam 10 and the second signal beam 11 can be obtained from a single laser, and can be equalized in wavelength or beam quality. As described above, in the input unit 13, the plural beams that a splitter such as the polarization beam splitter 18 produces through dividing are equalized in polarization direction by inputting one of the plural beams into a half-wave plate.

Figure 5:
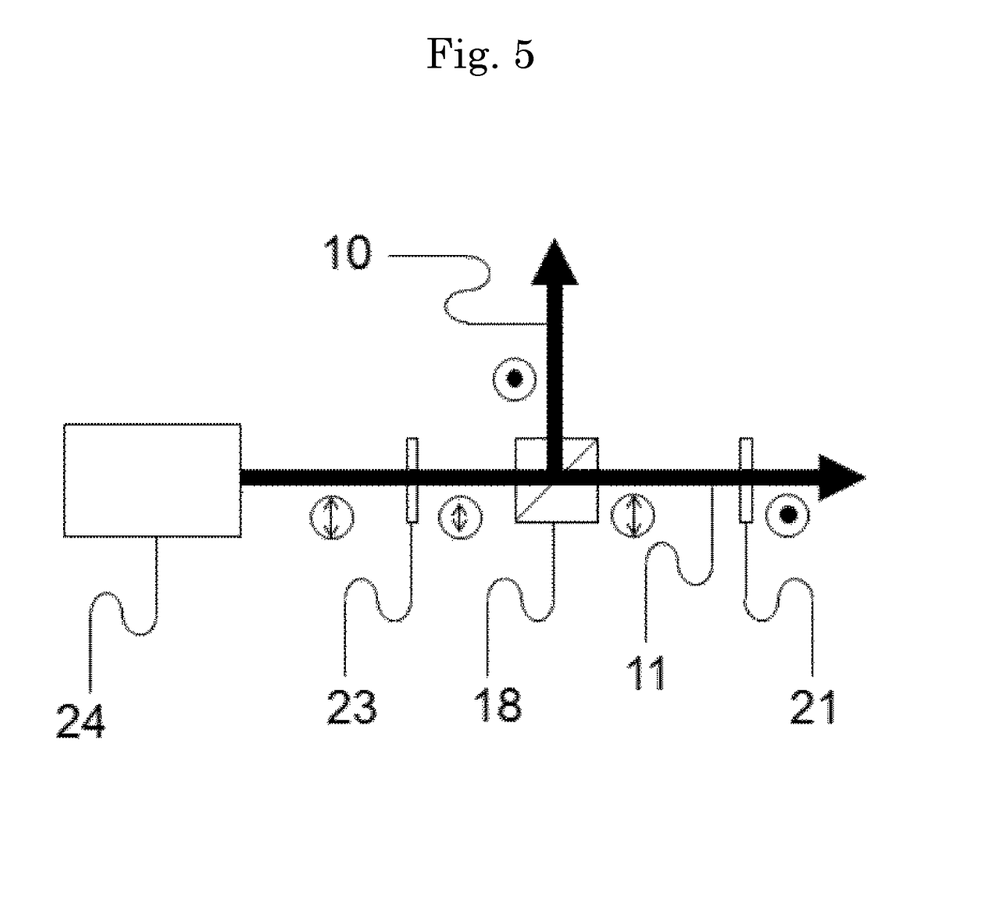
FIG. 5 is an illustration explaining another method for dividing a signal beam from a signal beam laser.

FIG. 5 is an illustration that explains another method for dividing the signal beam outputted from the single signal beam laser 20 into the first signal beam 10 and the second signal beam 11. In the figure, "23" donates a half-wave plate; "24" donates a linear polarization laser. For the signal beam laser 20, the linear polarization laser 24 is used. It is assumed that the linear polarization laser 24 is polarized parallel to the sheet of FIG. 5. Polarization of the laser polarized parallel to the sheet is rotated by 45 degrees through the half-wave plate 23. When the laser whose polarization is rotated by 45 degrees is inputted to the polarization beam splitter 18, a polarization beam component vertical to the sheet is reflected by the polarization beam splitter 18 to become a first signal beam 10, and a polarization beam component parallel to the sheet passes through the polarization beam splitter 18 to become a second signal beam 11. As a result, the polarized beam can be separated into the first signal beam 10 and the second signal beam 11. Furthermore, if a half-wave plate 21 is inserted in the first signal beam 10 or the second signal beam 11, the polarization directions of the first signal beam 10 and the second signal beam 11 can be adjusted to the same direction. According to a method having been explained in FIG. 5, the first signal beam 10 and the second signal beam 11 can be obtained from a single laser, and can be equalized in wavelength, beam quality, or the like. The rotation angle of polarization of the laser is adjusted by the half-wave plate 23 placed before the polarization beam splitter 18. By adjusting the rotation angle of polarization of the laser, the power ratio between the first signal beam 10 and the second signal beam 11 can be arbitrarily adjusted.

Figure 6:
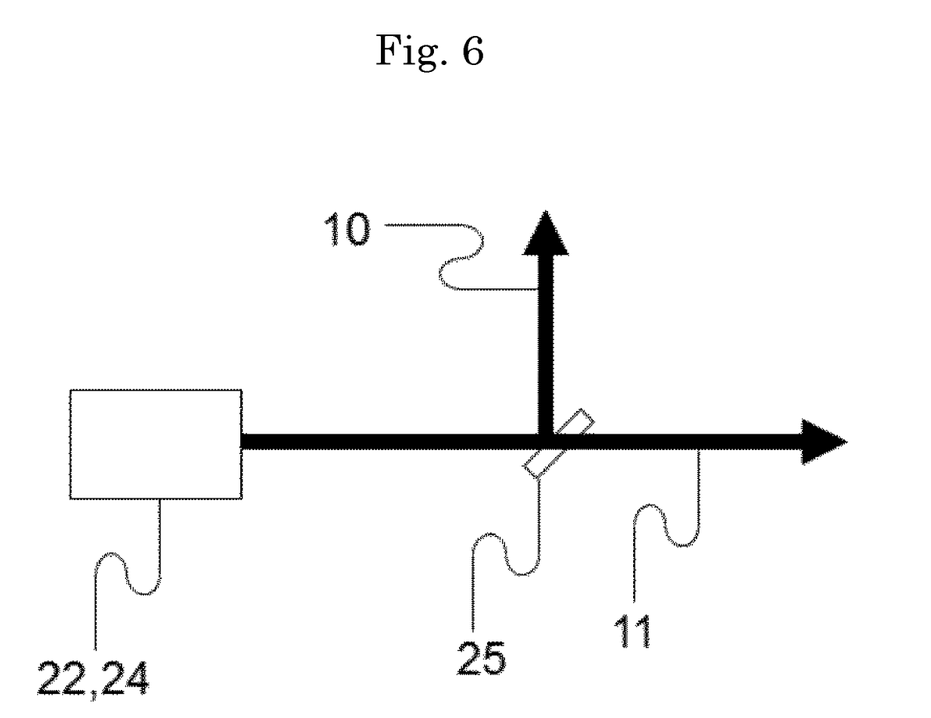
FIG. 6 is an illustration explaining another method for dividing a signal beam from a signal beam laser.

FIG. 6 is an illustration that explains another method for dividing the signal beam outputted from a single signal beam laser into the first signal beam 10 and the second signal beam 11. In the figure, "25" denotes a partial reflection mirror. A non-polarization laser 22 or a linear polarization laser 24 can be used as the signal beam laser 20. The output from the signal beam laser 20 can be separated into a first signal beam 10 and a second signal beam 11 by passing through and being reflected by the partial reflection mirror 25. According to a method explained in FIG. 6, the first signal beam 10 and the second signal beam 11 can be obtained from a single laser, and can be equalized in wavelength, beam quality, or the like. By selecting the reflectance of the partial reflection mirror 25, the power ratio between the first signal beam 10 and the second signal beam 11 can be arbitrarily adjusted.

As described above, in Embodiment 3, the input unit 13 inputs plural beams into the laser amplifier 12 at different angles. By adopting such a configuration, it is possible to obtain an extraction efficiency higher than those of conventional planar waveguide laser amplifiers. Furthermore, the plural beams are produced by dividing a signal beam outputted from the single signal beam laser 20 with a splitter such as the polarization beam splitter 18. With such a configuration, plural beams can be produced from a single signal beam laser 20, and plural beams can be produced efficiently. Moreover, in the input unit 13, one of the plural beams that the splitter produces through dividing is inputted into a half-wave plate. By this configuration, the polarization directions of plural beams can be adjusted to the same direction.

Embodiment 4

Figure 7:
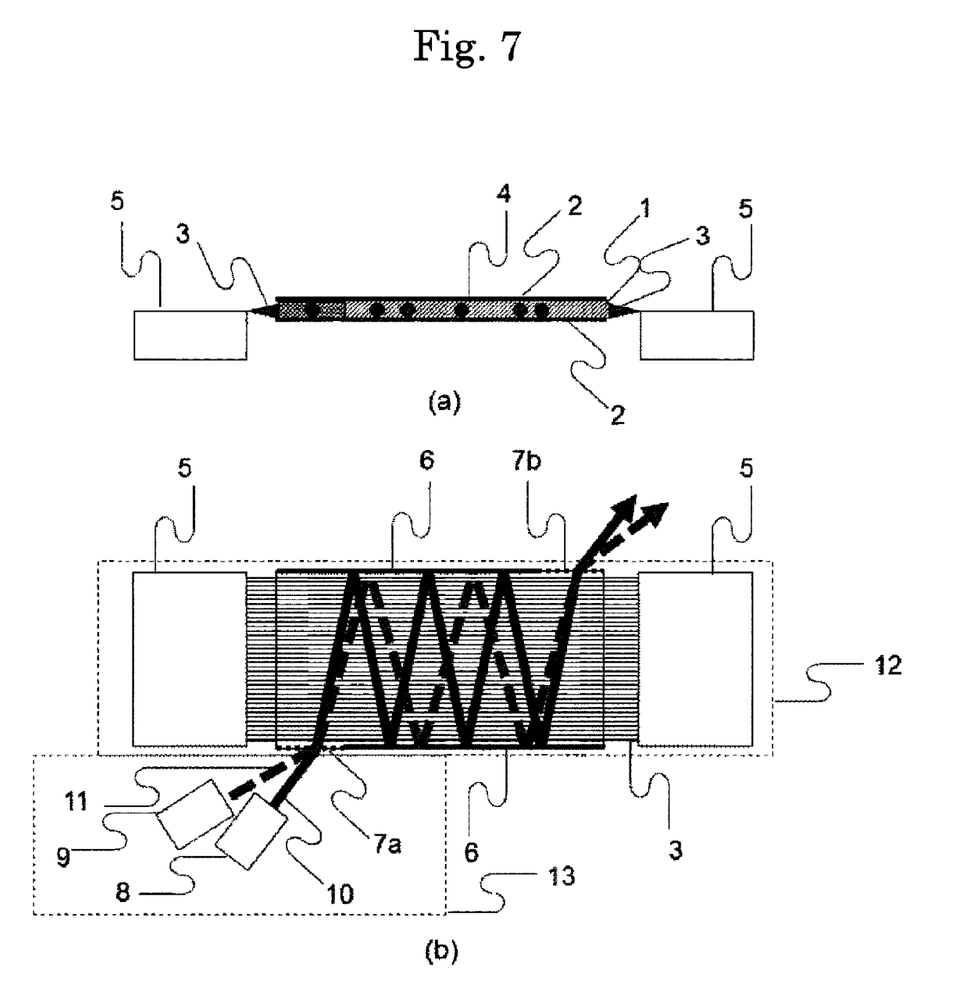
FIGS. 7 are views showing the configuration of a planar waveguide laser amplification device according to Embodiment 4 of the present invention.

In Embodiments 1 to 3, the first signal beam 10 and the second signal beam 11 have the same wavelength; however, in Embodiment 4, a configuration will be shown in which the first signal beam 10 and the second signal beam 11, being plural beams, have different wavelengths.

FIGS. 7 show a configuration of a planar waveguide laser amplification device according to Embodiment 4 of the present invention. FIG. 7(*a*) is a side view of the planar waveguide laser amplifier; FIG. 7(*b*) is a top front view thereof.

A second signal beam 11 outputted from a second signal beam laser 9 has a wavelength different from that of a first signal beam 10 outputted from a first signal beam laser 8. The first signal beam 10 outputted from the first signal beam laser 8 and the second signal beam 11 outputted from the second signal beam laser 9 enter the planar waveguide 4 through an anti-reflection film 7a.

In Embodiment 4, similarly to Embodiment 1, the first signal beam 10 and the second signal beam 11 are confined within and guided along the core layer 1. However, the second signal beam 11 outputted from the second signal beam laser 9 has a wavelength different from that of the first signal beam 10 outputted from the first signal beam laser 8. Therefore, plural wavelengths can be outputted from a single planar waveguide laser amplifier. Furthermore, if the laser gain unevenly spreads, plural signal beams of different wavelengths have different amplification factors. This reduces gain dropping caused by spectral hole burning which creates holes at a specific frequency in the spectrum, thereby improving the extraction efficiency.

Furthermore, the plural beams are produced by dividing a signal beam outputted from the single signal beam laser 20 with a splitter such as the polarization beam splitter 18. With such a configuration, plural beams can be produced from a single signal beam laser 20, and the plural beams can be produced efficiently. Moreover, in the input unit 13, one of the plural beams that the splitter produces through dividing is inputted into a half-wave plate. By this configuration, the polarization directions of plural beams can be adjusted to the same direction.

So far, explanation has been made using a single clad structure in which clad layers 2 are provided on the top and bottom faces of a core layer 1, so that excitation light and a signal beam are totally reflected on the interfaces between the core layer 1 and the clad layers 2 to be confined within the core layer 1. As another embodiment, it is possible to further provide, on the top and bottom faces, second clad layers having refractive indexes lower than those of the clad layers 2.

In this case, excitation light 3 is totally reflected on interfaces between the clad layers 2 and the second clad layers to be confined within the core layer 1 or the clad layers 2. Furthermore, the signal beams are totally reflected on interfaces between the core layer 1 and clad layers 2 to be confined within the core layer 1. Even in such a double clad structure waveguide, the methods described in Embodiments 1 to 4 can be performed.

As described above, the input unit 13 of Embodiment 4 inputs plural beams having different wavelengths into the laser amplifier 12. By adopting such a configuration, it is possible to obtain an extraction efficiency higher than those of conventional planar waveguide laser amplifiers.

In the scope of the present invention, it is possible to freely combine the individual embodiments, or to modify or omit any components of the individual embodiments. For example, three signal beam lasers may be provided. Furthermore, the laser amplifier 12 may be a planar waveguide laser amplifier.

Embodiment 5

Figure 8:
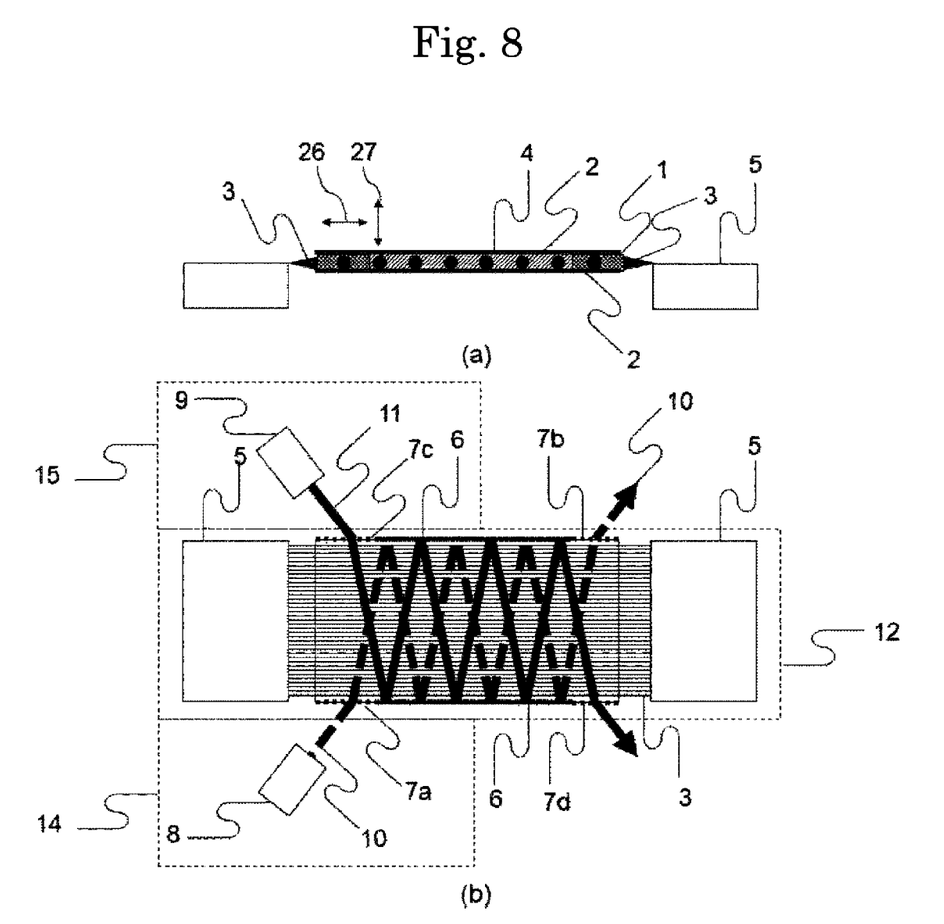
FIGS. 8 are views showing the configuration of a planar waveguide laser amplification device according to Embodiment 5 of the present invention.

In Embodiments 1 to 4, a specific configuration has not been described in which plural signal beams polarized differently have different wavelengths; in Embodiment 5, an effective configuration of that case will be described. An embodiment will especially be explained in which plural signal beams each having different wavelengths are inputted into a planar waveguide laser amplifier having a laser medium to give maximum gains at different wavelengths depending on respective polarization directions, in the polarization directions at which to maximize respective signal beams' gains, to thereby maximize amplification gains of respective signal beams.

FIGS. 8 are views showing the configuration of a planar waveguide laser amplification device according to Embodiment 5 of the present invention. FIG. 8(*a*) is a side view of the planar waveguide laser amplifier; FIG. 8(*b*) is a top front view thereof.

Embodiment 5 has a feature in that a first signal beam 10 outputted from a first signal beam laser 8 and a second signal beam 11 outputted from a second signal beam laser 9 each have different wavelengths and their polarization directions are orthogonal to each other. The core layer 1 has a feature in that the core layer is formed of a laser medium to give maximum gains at different wavelengths depending on the polarization directions of laser beams. An example of the laser medium that gives maximum gains at different wavelengths depending on respective polarization directions, is Nd:YLF. Nd:YLF has a high gain at a wavelength of 1047 nm for a signal beam with p-polarization (in a direction perpendicular to the c-axis of a crystal) and has a high gain at a wavelength of 1053 nm with s-polarization (in a direction parallel to the c-axis of a crystal).

The first signal beam 10 has a wavelength of 1053 nm, and is inputted, through an anti-reflection film 7a on a side face of the laser amplifier 12, into a planar waveguide 4 in the laser amplifier 12 so as to be a signal beam with p-polarization with respect to the core layer 1. On the other hand, the second signal beam 11 from an input unit 15 has a wavelength of 1047 nm, and is inputted, through an anti-reflection film 7c on the other side face of the laser amplifier 12, into the planar waveguide 4 of the laser amplifier 12 so as to be a signal beam with s-polarization with respect to the core layer 1. In addition, it is assumed that the c-axis of the crystal of the core layer 1 is parallel to a thickness-wise direction of the waveguide (the c-axis of the crystal of the core layer 1 is perpendicular to the clad layer 2). The first signal beam 10 inputted to the planar waveguide 4 is totally reflected on the interfaces between the core layer 1 and the clad layers 2 in the planar waveguide 4, and is confined within and guided along the core layer 1. The first signal beam 10 repeats reflection between the total reflection films 6 formed on the side faces of the planar waveguide 4 to follow a zigzag course, thereby getting amplified by the laser gain induced in the planar waveguide 4 by the semiconductor lasers 5 for excitation. The first signal beam 10 passes through an anti-reflection film 7b formed on a side face of the planar waveguide 4 to be outputted outside the planar waveguide 4.

Similarly, the second signal beam 11 inputted through an anti-reflection film 7c provided on a side face of the laser amplifier 12 opposite to the anti-reflection film 7a, is confined within and guided along the core layer 1 in the planar waveguide 4. The second signal beam 11 repeats reflection between the total reflection films 6 formed on the side faces of the planar waveguide 4 to follow a zigzag course, so that a signal beam component of a wavelength of 1047 nm is amplified by the laser gain induced in the planar waveguide 4 by the semiconductor lasers 5 for excitation. Here, in the planar waveguide 4, the second signal beam 11 goes along a path different from that of the first signal beam 10.

In Embodiment 5, similarly to Embodiment 4, the second signal beam 11 outputted from the second signal beam laser 9 has a wavelength different from that of the first signal beam 10 outputted from the first signal beam laser 8. Because a same transition band is utilized for laser gains of the signal beam 10 having a wavelength of 1053 nm and the signal beam 11 having a wavelength of 1047 nm, if the signal beam 10 and the signal beam 11 pass through a same path in the planar waveguide 4, the output of the signal beam 11 having a wavelength of 1047 nm to be amplified through a larger gain becomes larger than that of the signal beam 10 having a wavelength of 1053 nm to be amplified through a smaller gain; however, in Embodiment 5, the signal beam 10 goes, in the planar waveguide 4, along a path different from that of the signal beam 11, so that the first signal beam 10 can utilize a gain of the part of the planar waveguide 4 that the second signal beam 11 does not utilize. By using such a configuration, it is possible to obtain, from a single planar waveguide laser amplifier, large outputs of signal beams having different wavelengths.

So far, explanation has been made for a single clad structure in which the clad layers 2 are provided on the top and bottom faces of the core layer 1 so that excitation light and a signal beam are totally reflected on the interfaces between the core layer 1 and the clad layers 2 to be confined within the core layer 1. As an embodiment other than those embodiments, it is possible to further provide second clad layers having a refractive index smaller than that of the clad layers 2 on the top and bottom faces of the clad layers 2. In this case, excitation light 3 is totally reflected on interfaces between the clad layers 2 and the second clad layers to be confined within the core layer 1 or the clad layers 2. Furthermore, the signal beams are totally reflected on interfaces between the core layer 1 and the clad layers 2 to be confined within the core layer 1. Even in such a double clad structure waveguide, it is possible to carry out the method described in Embodiment 5.

In the scope of the present invention, it is possible to freely combine Embodiment 5 with Embodiments 1 to 4, or modify or omit any components of respective embodiments. For example, three signal beam lasers may be provided. In addition, the laser amplifier 12 may be a laser amplifier in which a slab type laser medium is used.

NUMERAL EXPLANATION

1: core layer
2: clad layer
3: excitation light
4: planar waveguide
5: semiconductor laser for excitation
6: total reflection film
7a, 7b: anti-reflection film
8: first signal beam laser
9: second signal beam laser
10: first signal beam
11: second signal beam
12: laser amplifier
13: input unit
16, 17: total reflection mirror
18: polarization beam splitter
20: signal beam laser
21: half-wave plate
22: non-polarization laser
23: half-wave plate
24: linear polarization laser
25: partial reflection mirror
26: polarization direction of first signal beam
27: polarization direction of second signal beam

The invention claimed is:

1. A laser amplification device comprising:
   a planar waveguide laser amplifier comprising reflection films on a side face of a planar waveguide on which laser beams are incident and on another side face of the planar waveguide opposite to the side face of the planar waveguide on which the laser beams are incident; and
   a laser unit to simultaneously input plural laser beams into the planar waveguide laser amplifier,
   wherein in the planar waveguide laser amplifier, excitation light is incident on the another side face of the planar waveguide on which the reflection films are not provided, and the laser beams reflected by the reflection films are amplified and outputted.

2. The laser amplification device according to claim 1, wherein the laser unit inputs, into the planar waveguide laser amplifier, the plural laser beams at different angles thereto or from different side faces thereof.

3. The laser amplification device according to claim 1, wherein the laser unit produces the plural laser beams by dividing, with a splitter, a laser beam outputted from a single signal beam laser.

4. The laser amplification device according to claim 3, wherein the laser unit is provided with a half-wave plate into which one of the plural laser beams that the splitter produces by dividing is inputted.

5. The laser amplification device according to claim 1, wherein the plural laser beams have different wavelengths.

6. The laser amplification device according to claim 1, wherein the planar waveguide laser amplifier includes a plate-shaped laser medium and clads formed on the top and bottom faces of the plate-shaped laser medium, and the plural laser beams are totally reflected on the clads formed on the top and bottom faces to be confined within the plate-shaped laser medium.

7. The laser amplification device according to claim 6, wherein the plural laser beams follow different paths in the plate-shaped laser medium.

8. The laser amplification device according to claim 7, wherein the plate-shaped laser medium is excited by the excitation light, and an anti-reflection film is provided on the side face of a planar waveguide to which the laser beams are inputted in the planar waveguide laser amplifier.

9. The laser amplification device according to claim 1, wherein the plural laser beams are polarized in polarization directions orthogonal to each other and have different wavelengths, and the laser medium included in the planar waveguide laser amplifier has a maximum gain at a different wavelength depending on the polarization directions of the inputted laser beams.

\* \* \* \* \*